US010999513B2

(12) United States Patent
Okubo

(10) Patent No.: US 10,999,513 B2
(45) Date of Patent: May 4, 2021

(54) INFORMATION PROCESSING APPARATUS HAVING CAMERA FUNCTION, DISPLAY CONTROL METHOD THEREOF, AND STORAGE MEDIUM

(71) Applicant: CANON KABUSHIKI KAISHA, Tokyo (JP)

(72) Inventor: Yuzuru Okubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/879,907

(22) Filed: Jan. 25, 2018

(65) Prior Publication Data

US 2018/0220077 A1 Aug. 2, 2018

(30) Foreign Application Priority Data

Jan. 31, 2017 (JP) .............................. JP2017-015437

(51) Int. Cl.
*H04N 5/232* (2006.01)
*H04N 5/262* (2006.01)

(52) U.S. Cl.
CPC ... *H04N 5/232933* (2018.08); *H04N 5/23216* (2013.01); *H04N 5/23222* (2013.01); *H04N 5/23293* (2013.01); *H04N 5/232945* (2018.08); *H04N 5/2624* (2013.01); *H04N 5/2628* (2013.01)

(58) Field of Classification Search
CPC ......... H04N 5/23293; H04N 5/232945; H04N 5/23216; H04N 5/23222; H04N 5/2624; H04N 5/2628
USPC ................................................... 348/333.01
See application file for complete search history.

(56) References Cited

U.S. PATENT DOCUMENTS

| 5,703,962 A | * | 12/1997 | Niki ...................... G06F 3/0485 |
| | | | 382/173 |
| 6,683,983 B1 | * | 1/2004 | Shen .................... G06K 9/3283 |
| | | | 358/452 |
| 2002/0012468 A1 | | 1/2002 | Togashi et al. |

(Continued)

FOREIGN PATENT DOCUMENTS

| JP | 07220025 A | * | 8/1995 |
| JP | 2002024762 A | | 1/2002 |

*Primary Examiner* — Sinh Tran
*Assistant Examiner* — Zhenzhen Wu
(74) *Attorney, Agent, or Firm* — Rossi, Kimms & McDowell LLP

(57) ABSTRACT

An information processing apparatus having a camera function, including: a display control unit configured to display a live view image acquired via a camera on a display unit; and an image analysis unit configured to perform, when performing an image capturing of an object every area: projective transformation of an image of an already-captured area of the object, for which image capturing has already been completed, onto a plane space of the live view image; and an image analysis to display the image of the already-captured area for which the projective transformation has been performed along with the live view image, and the display control unit displays, in accordance with analysis results by the image analysis unit, the image of the already-captured area for which the projective transformation onto the plane space of the live view image has been performed.

12 Claims, 12 Drawing Sheets

(56) References Cited

U.S. PATENT DOCUMENTS

| | | | | |
|---|---|---|---|---|
| 2011/0228044 A1* | 9/2011 | Miyamoto | ......... | H04N 5/23222 348/36 |
| 2012/0075412 A1* | 3/2012 | Miyamoto | ............. | G03B 35/00 348/36 |
| 2012/0194636 A1* | 8/2012 | Tokunaga | ............ | H04N 1/3935 348/36 |
| 2014/0351763 A1* | 11/2014 | Lee | ........................ | G03B 37/00 715/838 |
| 2015/0035859 A1* | 2/2015 | Ukigaya | ................ | G09G 5/377 345/629 |
| 2015/0070462 A1* | 3/2015 | Muninder | ............. | G06T 3/4038 348/36 |
| 2015/0138399 A1* | 5/2015 | Ma | ..................... | G06K 9/00624 348/239 |
| 2018/0046188 A1* | 2/2018 | Hwang | .................... | B64C 39/02 |
| 2018/0091728 A1* | 3/2018 | Brown | ................. | H04N 1/2145 |
| 2018/0213147 A1* | 7/2018 | Miyamoto | ......... | H04N 5/23222 |

* cited by examiner

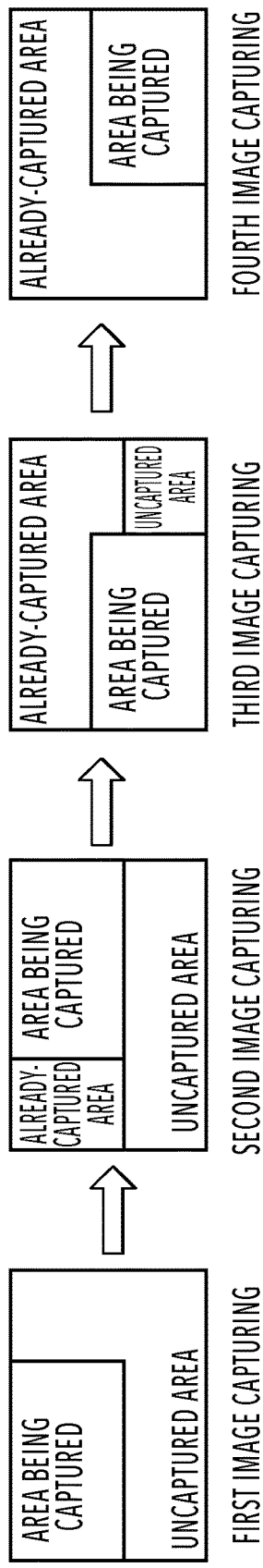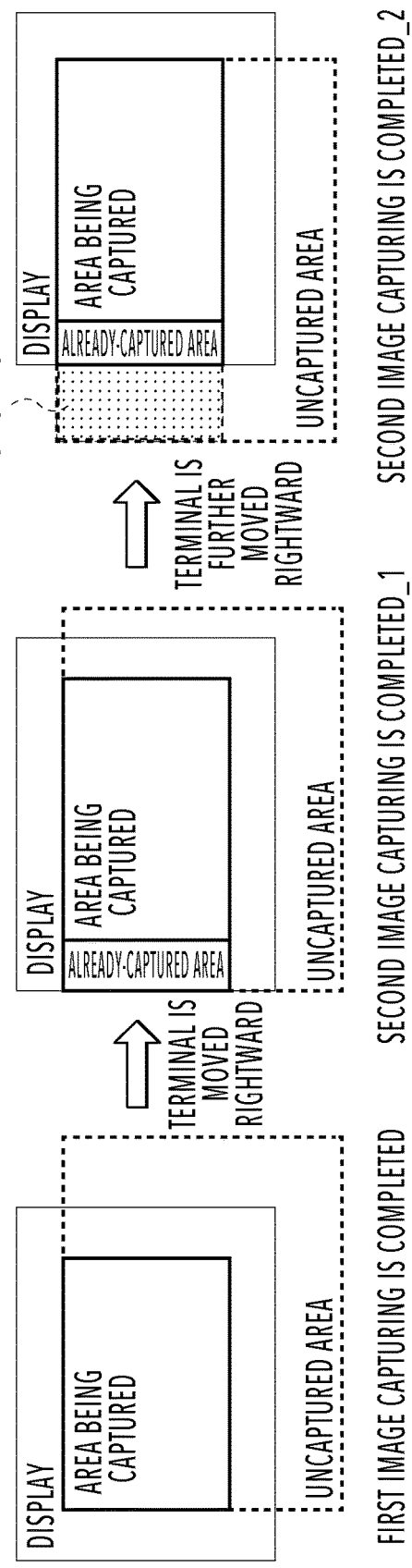

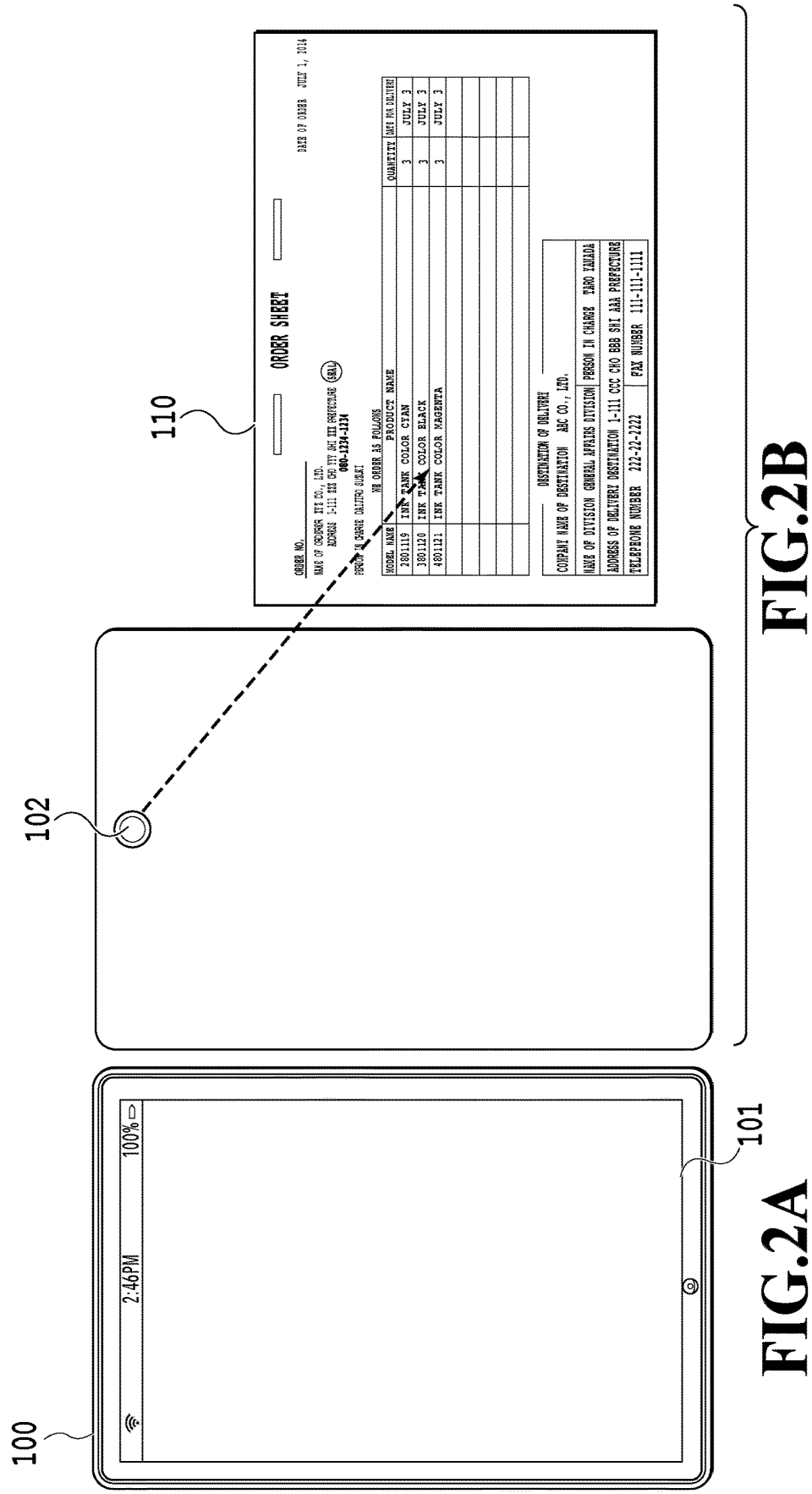

INFORMATION PROCESSING APPARATUS HAVING CAMERA FUNCTION, DISPLAY CONTROL METHOD THEREOF, AND STORAGE MEDIUM

BACKGROUND OF THE INVENTION

Field of the Invention

The present invention relates to a control technique of a guide display at the time of capturing an object in an information processing apparatus having a camera function.

Description of the Related Art

In recent years, at the time of acquiring information on a character and the like included in a document, such as a business form, the cases are increasing in number where the information is not read by a dedicated scanner and the like, but the information is captured by a camera function attached to a mobile device (hereinafter, called a "mobile terminal"), such as a smartphone and a tablet. However, generally, the resolution of a camera of a mobile terminal is low compared to that of a scanner. Because of this, in order to capture an entire document of a large sheet size, such as A3, in a state where character recognition with a predetermined or higher accuracy is possible in subsequent optical character recognition processing (OCR processing), it is required to perform image capturing by dividing the image capturing into a plurality of times.

Regarding this point, in the case where a document is captured by dividing image capturing into a plurality of times, for example, Japanese Patent Laid-Open No. 2002-024762 has disclosed a method of displaying an area that has gone out of the angle of view accompanying the movement of a camera and for which image capturing has already been completed as a guide in accordance with the display of an area currently being captured by the camera. FIG. 1A shows a display state in image capturing at each time in the case where a document is captured by dividing the image capturing into four times by using the technique of Japanese Patent Laid-Open No. 2002-024762. As shown in FIG. 1A, the already-captured area of the entire area of the image capturing-target document is displayed recognizably along with the area being captured, and therefore, it is possible for a user to perform the next image capturing by moving a mobile terminal while referring to the displayed already-captured area.

With the technique of the above-described Japanese Patent Laid-Open No. 2002-024762, the already-captured area and the area being captured of the entire area of the image capturing-target document are displayed at the same time on the display. At this time, the area being captured is always displayed on the display, and therefore, there is a case where the already-captured image as a guide extends off the display (see FIG. 1B). In this case, the already-captured area that can be visually recognized by a user is not secured sufficiently, and therefore, the original function as a guide display will be lost.

SUMMARY OF THE INVENTION

The information processing apparatus according to the present invention is an information processing apparatus having a camera function, including: a display control unit configured to display a live view image acquired via a camera on a display unit; and an image analysis unit configured to perform, when performing an image capturing of an object every area: projective transformation of an image of an already-captured area of the object, for which image capturing has already been completed, onto a plane space of the live view image; and an image analysis to display the image of the already-captured area for which the projective transformation has been performed along with the live view image, and the display control unit displays, in accordance with analysis results by the image analysis unit, the image of the already-captured area for which the projective transformation onto the plane space of the live view image has been performed.

Further features of the present invention will become apparent from the following description of exemplary embodiments with reference to the attached drawings.

BRIEF DESCRIPTION OF THE DRAWINGS

FIG. 1A and FIG. 1B are diagrams explaining the prior art;

FIG. 2A and FIG. 2B are diagrams showing an example of an external appearance of a mobile terminal;

FIG. 9B is a diagram showing a state of a display at the time of second image capturing in the case where image capturing is performed by dividing the image capturing into three times in total;

FIG. 10 is a diagram showing the way one entire image is finished by combining a total of three captured images.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

As an example of a mobile information processing apparatus having a camera function according to the present embodiment, in the following, explanation is given by taking a mobile terminal with a camera as an example. A so-called tablet PC or smartphone is a typical example of a mobile terminal capable of image capturing and data communication in an arbitrary place due to installation of a wireless communication function and the like.

FIG. 2A and FIG. 2B are diagrams showing an example of an external appearance of a mobile terminal. FIG. 2A shows the surface side (front side) of a mobile terminal 100 on which a touch panel 101 as a display unit exists. The touch panel 101 includes, for example, a capacitive LCD and the like, and includes two functions, that is, a function to output (display) information and a function to input information. FIG. 2B shows the backside (rear side) of the mobile terminal 100. On the rear side of the mobile terminal, an image capturing lens (hereinafter, a "lens") 102 to take in an image is included. In the present embodiment, a user of the mobile terminal 100 captures a document (here, an order sheet 110), which is an object, by using a mobile application, to be described later. The object may be a character or the like that is written to a large-sized photo or a whiteboard, in addition to a paper document, such as the order sheet 110. It is possible for the mobile application, to be described later, to take in an image of an object and display the taken-in image on the touch panel 101.

[Hardware Configuration]

Figure 3:
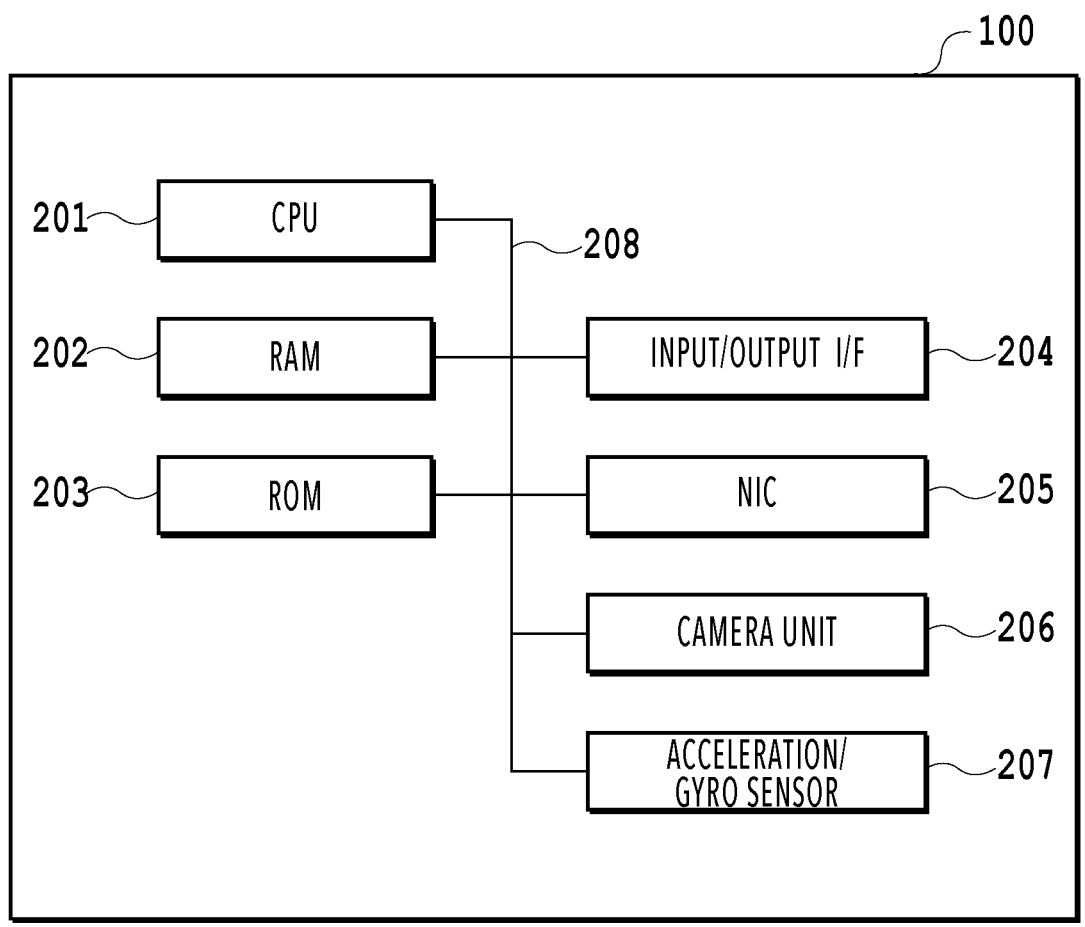
FIG. 3 is a diagram showing an example of a hardware configuration of the mobile terminal.

Following the above, a hardware configuration of the mobile terminal 100 is explained. FIG. 3 is a diagram showing an example of a hardware configuration of the mobile terminal 100. The mobile terminal 100 includes a CPU 201, a RAM 202, a ROM 203, an input/output I/F 204, a NIC 205, a camera unit 206, and an acceleration/gyro sensor 207 and each of these units is connected to one another by a bus 208.

The CPU 201 is a central processing unit that implements various functions by executing various programs. The RAM 202 is a readable/writable memory storing various pieces of information. The RAM 202 is also made use of as a work area of the CPU 201. The ROM 203 is a memory storing an OS and various programs, such as the above-described image capturing application. For example, the CPU 201 loads a program stored in the ROM 203 onto the RAM 202 and executes the program. Further, it is also possible for the CPU 201 to read a program stored in an external storage device (not shown schematically), such as a flash memory, an HDD, and an SSD, and to execute the program. It may also be possible to implement all or part of the functions of the mobile terminal 100 and the processing according to sequences, to be described later, by using dedicated hardware.

The input/output I/F 204 is an interface that outputs display data to the touch panel 101 and receives input information from the touch panel 101. The NIC (Network Interface Card) 205 is an interface to connect the mobile terminal 100 to a network (not shown schematically). The camera unit 206 takes in an image of an object to the mobile terminal 100 via the lens 102. The bus 208 is a data communication path that connects each unit described above. The acceleration/gyro sensor 207 is a sensor that detects attitude information on the mobile terminal 100.

[Software Configuration]

Figure 4:
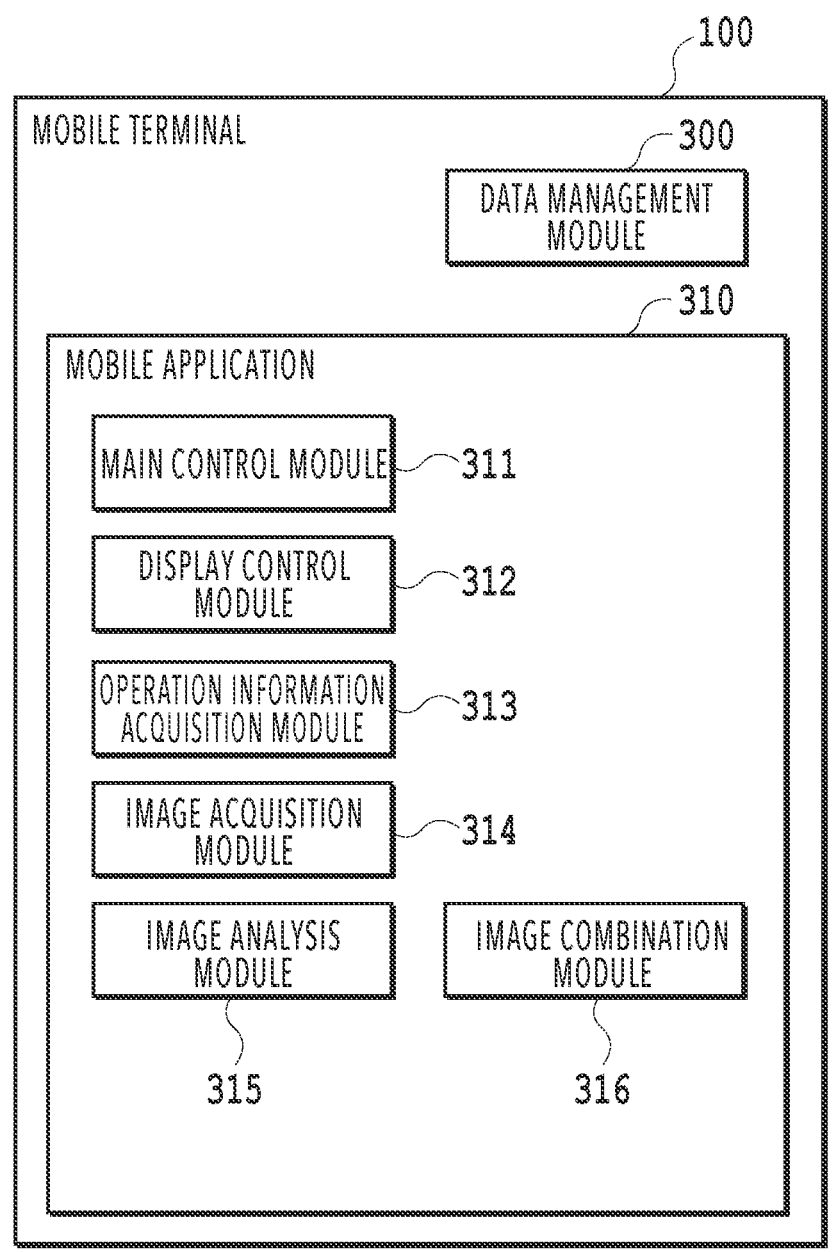
FIG. 4 is a diagram showing an example of a software configuration of the mobile terminal.

Next, a software configuration of the mobile terminal 100 is explained. FIG. 4 is a diagram showing an example of a software configuration of the mobile terminal 100. The software of the mobile terminal 100 includes a data management module 300 and a mobile application 310. Then, the mobile application 310 includes a plurality of modules 311 to 316 corresponding to each function of main control, display control, operation information acquisition, image acquisition, image analysis, and image combination. As described previously, a program corresponding to each of these modules is stored in the ROM 203 and the like.

The data management module 300 manages image data captured by the camera unit 206, processing data (application data) in the mobile application 310, and so on. The mobile application 310 accesses various pieces of data managed by the data management module 300 by making use of a control API (Application Programming Interface) provided by an OS, not shown schematically.

It is possible for a user to download and install the mobile application 310 by making use of an installation function of the OS of the mobile terminal 100. The mobile application 310 captures an object by using the camera unit 206 and performs various kinds of processing for the obtained captured image data.

Figure 5:
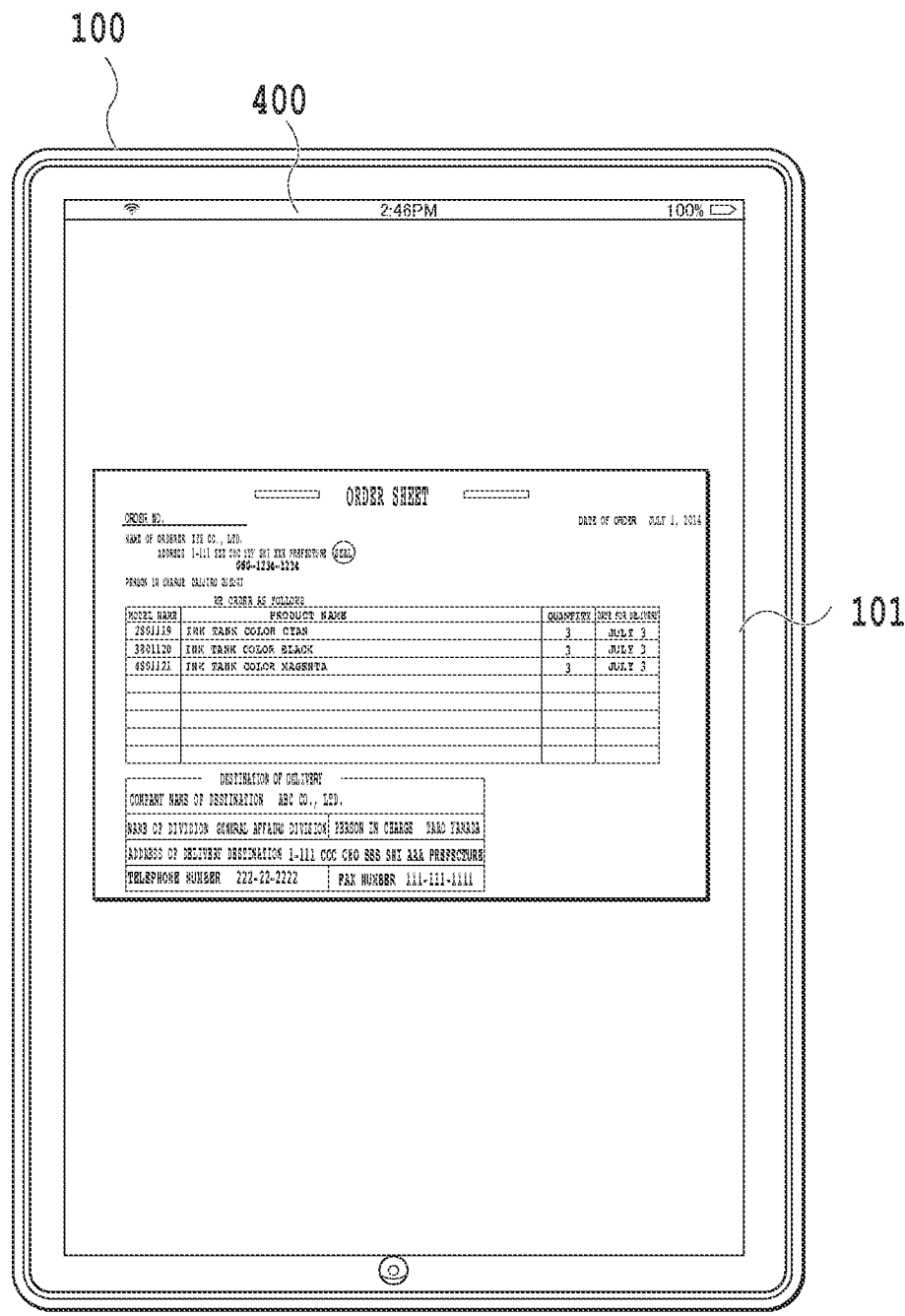
FIG. 5 is a diagram showing a display state of a touch panel at the time of activation of a mobile application.

The main control module 311 is a module that centralizedly controls the mobile application 310 and gives instructions to and performs management of each of the following modules 312 to 316. The display control module 312 provides a user interface (UI) of the mobile application 310 in accordance with instructions from the main control module 311. FIG. 5 is a diagram showing a display state of the touch panel 101 at the time of activation of the mobile application 310. Here, in a display/operation area 400 of the touch panel 101, an image (live view image) taken in via an image capturing sensor of the camera unit 206 is displayed and it is possible for a user to perform various operations for the live view image. It is needless to say that the configurations (position, size, range, arrangement, display contents, and so on) of the UI of the mobile application 310 are not limited to those shown schematically.

The operation information acquisition module 313 acquires input information relating to a user operation via the touch panel 101 and delivers the acquired input information to the main control module 311. For example, in the case where a user touches the display area 400 by his/her hand, the operation information acquisition module 313 detects the touched position and transmits information on the detected position to the main control module 311.

The image acquisition module 314 acquires an image taken in by the image capturing sensor of the camera unit 206. Further, the image acquisition module 314 converts the resolution of the acquired image into an arbitrary resolution in accordance with the necessity in the case where, for example, an image with a resolution reduced lower than that of an image to be saved is displayed on the touch panel 101.

The image analysis module 315 performs various kinds of image processing for a captured image acquired by the image acquisition module 314. For example, the image analysis module 315 performs feature point extraction to track an image capturing area, character recognition (OCR) to acquire character information, projective transformation for a captured image, a reduction ratio calculation, and so on.

The image combination module 316 generates one image (entire image) corresponding to the entire object by linking a plurality of images captured by dividing image capturing into a plurality of times. At this time, the image combination module 316 also performs processing, such as paper surface detection to exclude areas other than an object, enlargement/reduction, and distortion correction to correct a distorted portion, for the captured image.

[Basic Flow]

Figure 6:
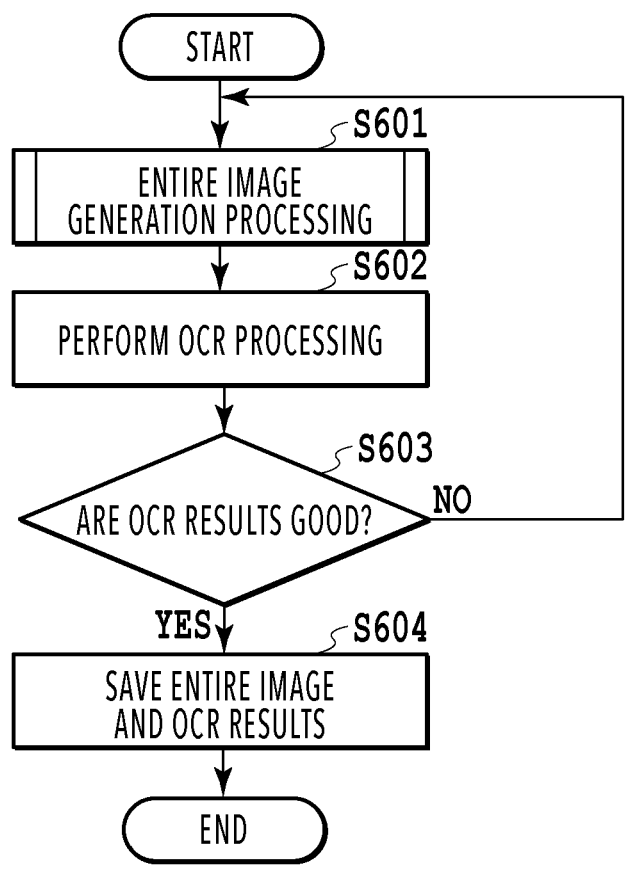
FIG. 6 is a flowchart showing a basic flow of the mobile application.

Following the above, a rough flow (basic flow) is explained in which an entire image is generated by capturing an object by using the mobile terminal 100 by dividing image capturing into a plurality of times, OCR processing is performed for the entire image, and thereby, character information included in the object is acquired. FIG. 6 is a flowchart showing the basic flow. This basic flow starts by, for example, a user activating the mobile application 310 as a trigger.

At step 601, processing to generate an entire image by capturing a document, such as a business form, by dividing image capturing into a plurality of times is performed (entire image generation processing). Details of the entire image generation processing will be described later. At step 602 that follows, OCR processing is performed for the entire image obtained at step 601. Then, at step 603, whether the character recognition results obtained by OCR processing are good is determined. Specifically, all or part of the character recognition results are displayed in the display area 400 and a user is caused to check whether the character is recognized correctly. Then, the user inputs the results of the check via the display area 400. In the case where the user determines that the character recognition results are not good, the processing returns to step 601 and the entire image generation processing is performed again. On the other hand, in the case where the user determines that the character recognition results are good, the processing advances to step 604. In the case where the character recognition results are not good, it may also be possible to design the flow so that the processing advances to step 604 after the user manually corrects the portion where character recognition is erroneous to the correct contents.

At step 604, the entire image used for OCR processing and the character recognition results thereof are saved by the data management module 301. The destination of saving at this time may be the RAM 202 or an SD card, not shown schematically, within the mobile terminal 100, or in addition to those, a PC or a server on the network. It may also be possible to temporarily store the entire image and the character recognition results thereof within the mobile terminal 100 and then to upload all of them to the PC or the server at a time after a predetermined time elapses.

[Entire Image Generation Processing]

Following the above, details of the entire image generation processing at step 601 described previously are explained. Before giving specific explanation, terms that appear in the following explanation are reviewed. First, the "live view image" refers to an image that is taken in by the image capturing sensor and which is currently being displayed on the display of the mobile terminal, corresponding to the "area being captured" in FIG. 1A and FIG. 1B described previously. The "captured image" refers to an image that is saved as an image corresponding to part of an object, such as a business form, and which is used for generation of the entire image. The display in the present embodiment is the touch panel 101.

Figure 7:
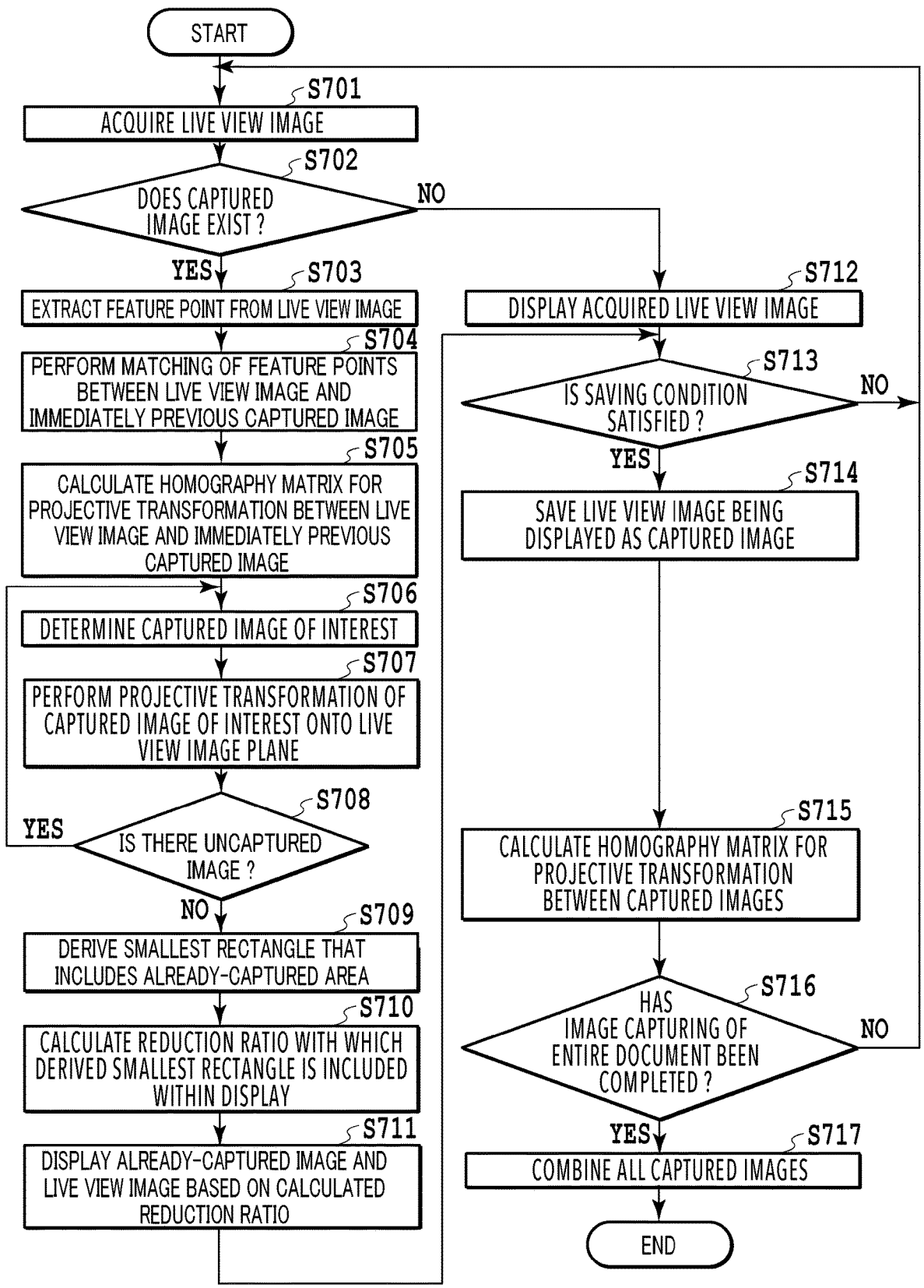
FIG. 7 is a flowchart showing a flow of entire image generation processing.

In the following, along the flowchart shown in FIG. 7, the entire image generation processing is explained in detail. The entire image generation processing is roughly divided into two processing groups. One processing group includes processing that is performed at step 703 to step 711, that is, processing to display an already-saved captured image as a guide along with a live view image. The other processing group includes processing that is performed at steps 712 to 717, that is, processing to save a live view image obtained by capturing part of an object as a captured image and to perform an analysis necessary for a guide display. In the present embodiment, explanation is given by taking a case as an example where a total of three captured images are acquired by performing image capturing three times in total from the left side of a document, which is an object, toward the right side, and then one entire image is generated by combining the three captured images. It is assumed that information on the fundamental image capturing conditions, such as the start position and the end position of image capturing, the total number of times of image capturing, and the image capturing order, is set and stored in advance in the RAM 202 and the like. In accordance with the actual image capturing flow at the time of executing the mobile application 310, each step of the flow in FIG. 7 is explained.

At step 701, the image acquisition module 314 acquires data of a live view image taken in via the camera unit 206 at predetermined timing. The timing to acquire a live view image (timing at which the image capturing sensor of the camera unit 206 takes in an image) is predetermined intervals, for example, such as 20 to 100 msec intervals.

At step 702, the processing is branched according to whether there is an already-saved captured image. In the case where there is an already-saved captured image, the processing advances to step 703 and then processing to display the captured image as a guide while displaying the live view image is performed. On the other hand, in the case where there is no already-saved captured image, the processing advances to step 712. In the stage immediately after the start of execution of the entire image generation processing (stage where image capturing is started), no already-saved captured image exists, and therefore, the processing advances to step 712. Then, at step 712, the display control module 312 displays the live view image acquired at step 701 on the touch panel 101.

At step 713 following step 712, the image analysis module 315 determines whether the live view image currently being displayed is sufficiently appropriate as an image used for generation of the entire image (whether the condition that the live view image is saved as a captured image is satisfied). In the case where the saving condition is satisfied, the processing advances to step 713 and in the case where the condition is not satisfied, the processing returns to step 701. Here, as the saving condition, for example, mention is made of that an appropriate portion within the target document, which is an object, is captured, that the image is not out of focus (no camera-shake has occurred), that the lightness is enough, and so on. Whether an appropriate portion within the target document is captured is determined based on whether the corner or edge of the document is detected, a degree of overlap with an already-captured area, and so on. The present invention premises that the entire object is captured by dividing image capturing into a plurality of times, and therefore, the live view image is an image corresponding to part of the object. In the case where a document, which is an object, is captured by dividing image capturing into three times, on a condition that the top-left corner and the bottom-left corner are detected in the first image capturing, the top and bottom edges are detected in the second image capturing, and the top-right corner and the bottom-right corner are detected in the third image capturing, respectively, it can be concluded that an appropriate portion is captured. Further, it is possible to determine a degree of overlap with an already-captured area by performing feature point extraction for the live view image being displayed and performing matching of the feature points. In view of the matching accuracy and the margin in the combination processing, to be described later, it is desirable that the overlap portion be, for example, about 25%. At this time, in the case where it is possible to extract feature points enough to obtain a sufficient matching accuracy (for example, five sets or more), the overlap portion may be smaller. Here, the feature point is a point on an image, which has characteristic information. As the feature point extraction method, the corner detection by Harris, SIFT (Scale-Invariant Feature Transform), SURF (Speeded Up Robust Features), and so on, are known. In the case where the object is a business form, such as an order sheet, it is generally considered that the portion where the ruled lines intersect and the corner portion where lines intersect at right angles correspond to the characteristic portions. However, in actuality, there are many portions similar to the characteristic portion, and therefore, there is a case where such a characteristic portion is not appropriate as a feature point. In this case, it may be possible to extract a characteristic illustration, character, and so on, as a feature point other than the ruled line and the corner portion. It may also be possible for the processing to automatically advance to step 714 at the time in point at which the satisfaction of the saving condition as described above is confirmed or to advance to step 714 upon receipt of user instructions.

At step 714, the image combination module 315 saves (stores in the RAM 202) the data of the live view image being displayed as the captured image used for combination processing. At this time, the analysis results of the saving condition at step 713, that is, information on the extracted feature points and information on the position coordinates of the detected corners and edges are also saved in association with the captured image.

At step 715, the image analysis module 315 calculates a homography matrix to perform projective transformation between captured images for the saved captured images. Here, the homography matrix is a 3-row, 3-column matrix representing projective transformation from a plane on a three-dimensional space into another plane. Consequently, the homography matrix calculated at this step is a matrix to perform projective transformation from a plane space of a captured image into a plane space of another captured image. It is known that a homography matrix is found by using simultaneous equations with eight unknowns given four sets of points corresponding to planes for which projective transformation is performed. In the case where there are five or more sets of points, it may also be possible to reduce the error by the least squares method. Here, it is assumed that a homography matrix (projective transformation matrix) from an Mth captured image into an Nth captured image is represented as $H_M^N$. In the case where the immediately previous captured image having just been saved at step 713 is taken to be the Nth captured image, $H_{N-1}^N$ is calculated by using an (N−1)th captured image. Further, homography matrixes $H_1^{N-1}$, $H_2^{N-1}$, ..., $H_{N-2}^{N-1}$ in the past image capturing are updated by using $H_{N-1}^N$ having just been calculated. Specifically, $H_1^N$, $H_2^N$, ..., $H_{N-2}^N$ are obtained by multiplying each of $H_1^{N-1}$, $H_2^{N-1}$, ..., $H_{N-2}^{N-1}$ by $H_{N-1}^N$. At this step, not only the processing to find the homography matrix $H_{N-1}^N$ from the (N−1)th captured image into the Nth captured image but also the processing to update the homography matrixes $H_1^{N-1}$, $H_2^{N-1}$, ..., $H_{N-2}^{N-1}$ in the past image capturing is performed.

At step 716, the image analysis module 315 determines whether the image capturing of the entire document has been completed. In the present embodiment in which image capturing is performed three times in total, in the case where three captured images are saved in the image combination module 316, it is determined that the image capturing of the entire document has been completed. In the case where the image capturing of the entire document has been completed, the processing advances to step 717. On the other hand, in the case where there is an uncaptured area, the processing returns to step 701.

Next, the processing group (step 703 to step 711) to display a saved captured image as a guide is explained.

In the case where one or more captured images are already obtained (Yes at step 702), at step 703, the image analysis module 315 extracts feature points from the live view image acquired at step 701. The feature point extraction method is the same as explained at step 713. After extracting feature points, the image analysis module 315 performs matching of the feature points between the acquired live view image and the captured image saved immediately previously at step 704. The determination of similarity between feature vectors is performed by using, for example, the Euclidean distance, the Manhattan distance, the correlation coefficient, and so on. Further, at step 705, the image analysis module 315 calculates a homography matrix $H_N^{LiveView}$ to perform projective transformation of the captured image saved immediately previously onto the plane space of the live view image.

At step 706, a captured image on which attention is focused is determined from among the saved captured images. Then, at step 707, the image analysis module 315 performs projective transformation of the captured image of interest onto the plane space of the live view image by using the matching results at step 704 and the homography matrix calculated at step 705. Here, it is assumed that the captured image saved immediately previously is the Nth captured image. It is possible to project this Nth captured image onto the plane space of the live view image by using the homography matrix $H_N^{LiveView}$ calculated at step 705. For the first to (N−1)th captured images, the homography matrixes $H_1^N$, $H_2^N$, ..., $H_{N-2}^N$, $H_{N-1}^N$ to perform projective transformation of the Nth captured image, which are calculated and updated at step 715, are multiplied by the homography matrix $H_N^{LiveView}$ calculated at step 705. Then, the homography matrixes $H_N^{LiveView}$, $H_2^{LiveView}$, ..., $H_{N-2}^{LiveView}$, $H_{N-1}^{LiveView}$ from the plane space of each captured image into the plane space of the live view image are obtained. By using the homography matrixes thus obtained, the first to (N−1)th captured images are projected onto the plane space of the live view image. At this time, in the case where there is a plurality of capture images, it may also be possible to perform projection after performing predetermined image processing, such as setting different colors to different captured images so that each captured image can be identified. Further, it may also be possible to apply a mask so that only the document portion is projected and the unnecessary background portion is not projected by using the position information on the corners and edges of the document saved in association with the captured image.

At step 708, whether there is an unprocessed captured image is determined. In the case where all the saved captured images have been processed as the captured image of interest, the processing advances to step 709. On the other hand, in the case where there remains an unprocessed captured image, the processing returns to step 706, and the next captured image of interest is determined and the processing is continued.

At step 709, the image analysis module 315 derives the smallest rectangle including the live view image and the already-captured area for which projective transformation onto the plane space has been performed. At the time of derivation, it may also be possible to find the smallest rectangle including only the document portion by referring to the position information on the corners and edges of the document saved in association with each captured image.

Figure 8:
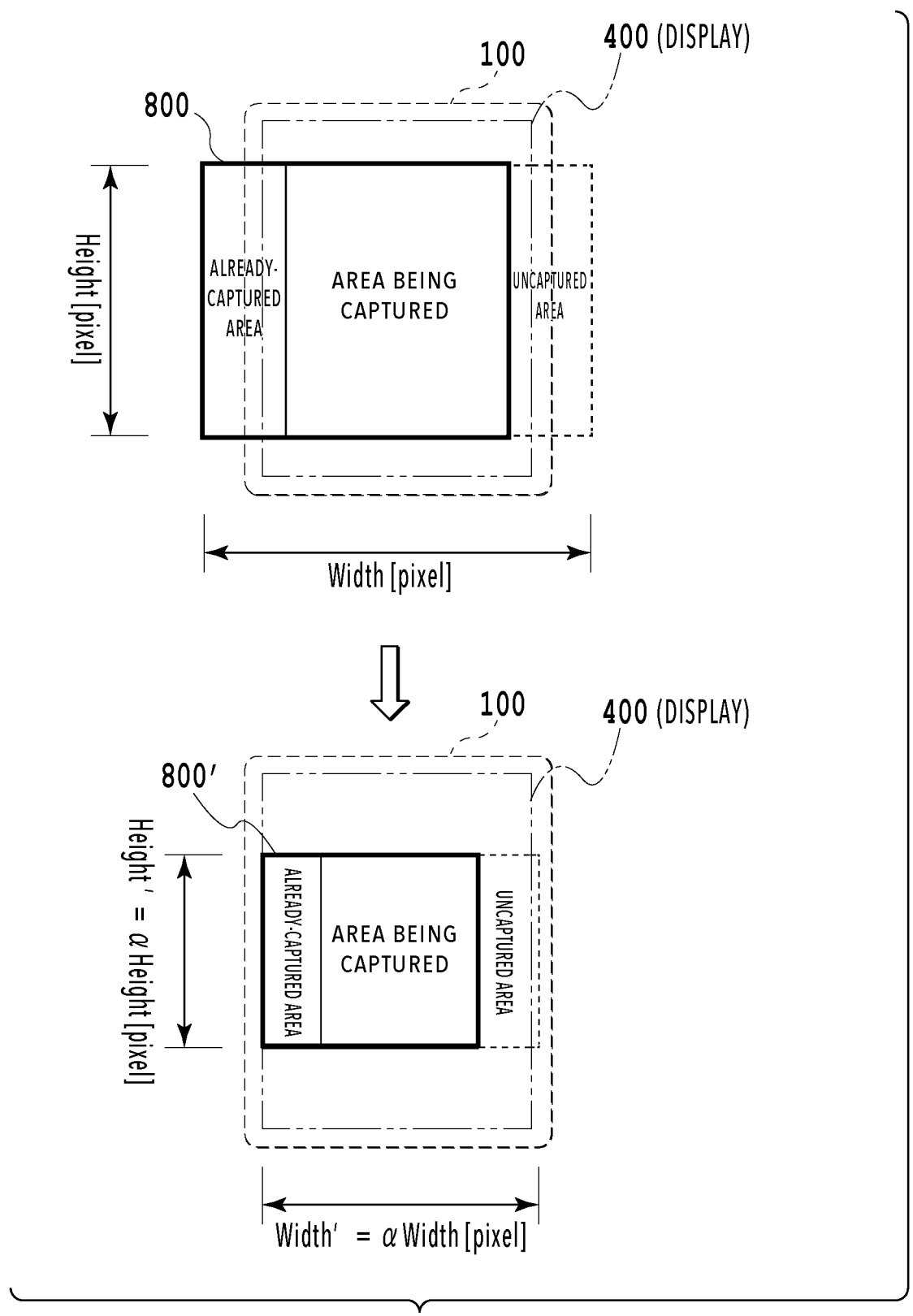
FIG. 8 is an explanatory diagram of a reduction ratio calculation.

At step 710, the image analysis module 315 calculates a reduction ratio with which the smallest rectangle found at step 709 is included within the display area of the display. FIG. 8 is an explanatory diagram of a reduction ratio calculation. The upper diagram in FIG. 8 shows a smallest rectangle 800 before reduction, in which part of the already-captured area extends off the frame of the display (the display area 400 of the touch panel 101). On the other hand, the lower diagram in FIG. 8 shows a smallest rectangle 800' after reduction is performed with a reduction ratio α and it is known that the entire already-captured area is included within the display area of the display. The reduction ratio α is found from the coordinates representing the vertexes of the smallest rectangle and the number of constituent pixels of the display. In the example in FIG. 8, it is assumed that the number of constituent pixels of the touch panel is 600 in the horizontal direction and 800 in the vertical direction. Then, it is assumed that the coordinates of the vertexes of the smallest rectangular are (−400, 300), (−400, −300), (250, 300), and (250, −300) in the case where the center of the display area 400 is taken to be the origin (0, 0)=(horizontal direction, vertical direction). In this case, first, in each of the horizontal direction and the vertical direction, a value that exceeds the range of the number of constituent pixels of the display and whose absolute value is the largest is found. In this case, the center of the display is taken to be the origin, and therefore, the value that is half the number of constituent pixels is taken to be a reference both in the horizontal direction and in the vertical direction. In the case of the above-described example, in the horizontal direction, the vertexes whose absolute value exceeds a value of 300 that is half the number of pixels, that is, 600, are the two vertexes having values of −400 and 400, and therefore, the number of pixels is 400. Further, in the vertical direction, there is no vertex having an absolute value exceeding the value 400 that is half the number of pixels, that is, 800. Consequently, the number of pixels, that is, 400, in the horizontal direction is used for the calculation of the reduction ratio α. Specifically, reduction ratio α=300 (half the number of constituent pixels in the horizontal direction)/400=0.75 is obtained.

In the case where the relevant vertex exists both in the horizontal direction and in the vertical direction, one whose absolute value is larger is used. Further, in the case where no relevant vertex exists, this means that it is not necessary to perform reduction, and therefore, the reduction ratio α is 1.0.

Figure 9A:
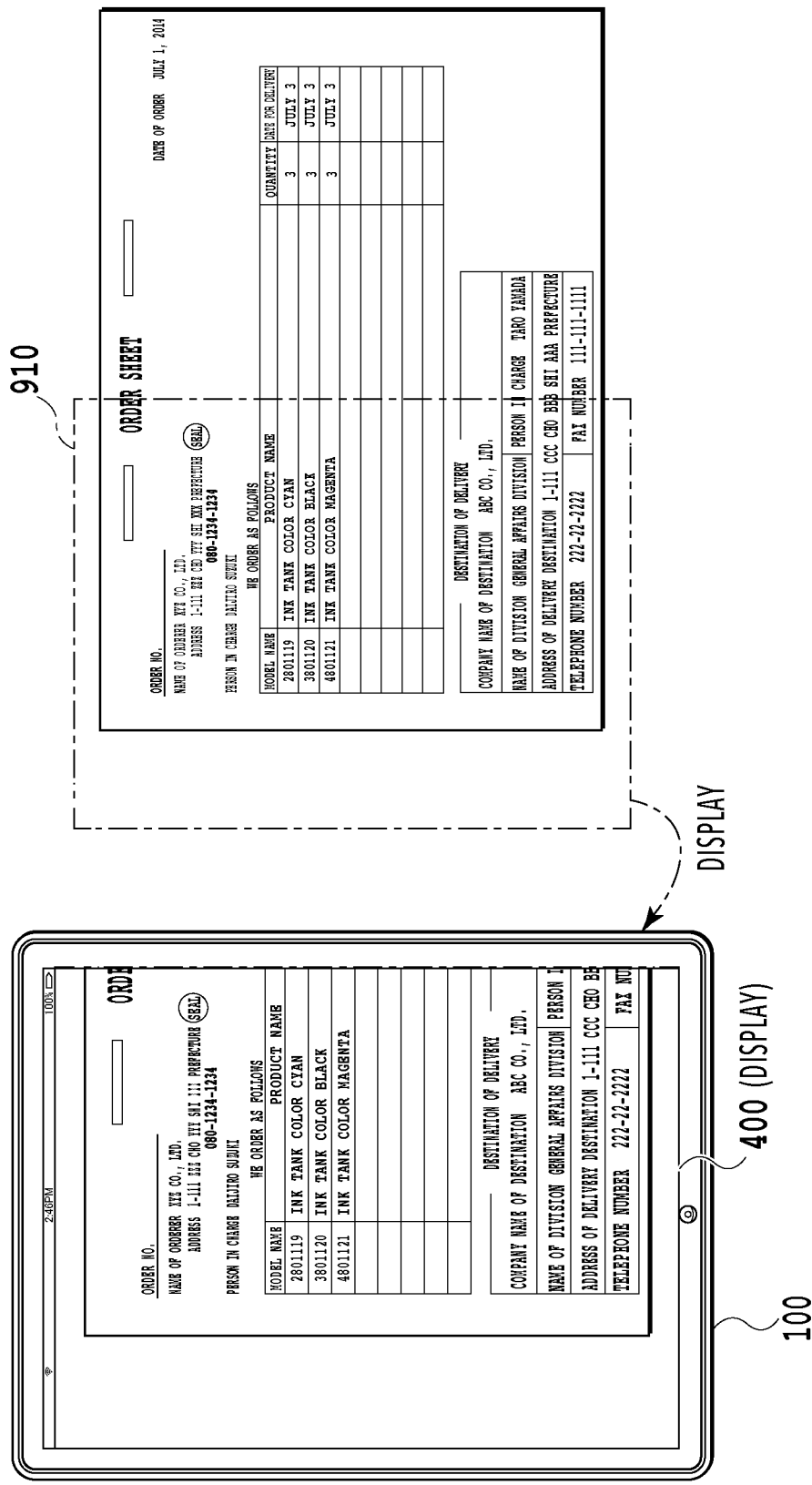
FIG. 9A is a diagram showing a state of a display at the time of first image capturing in the case where image capturing is performed by dividing the image capturing into three times in total.
Figure 9B:
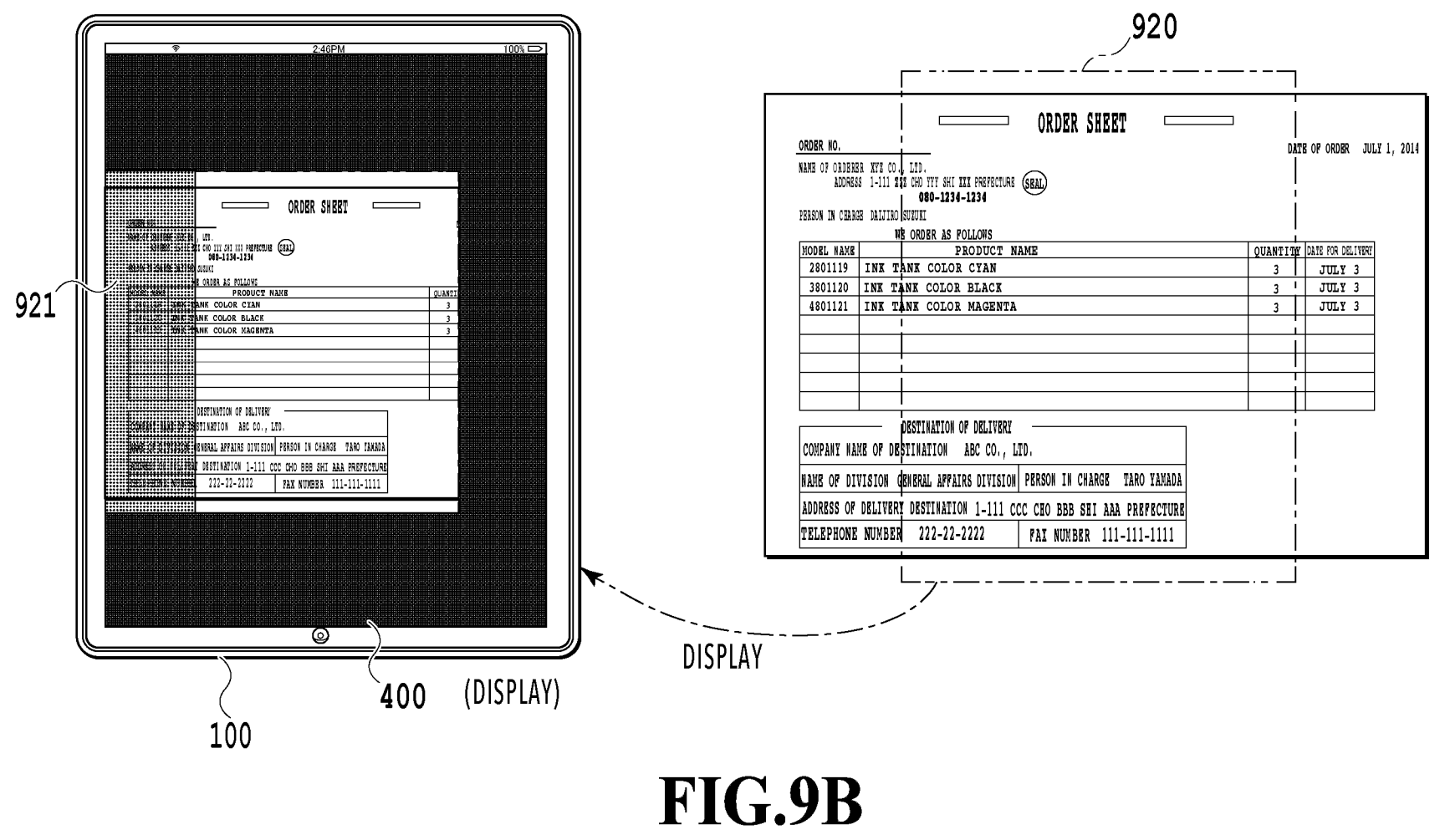
Figure 9C:
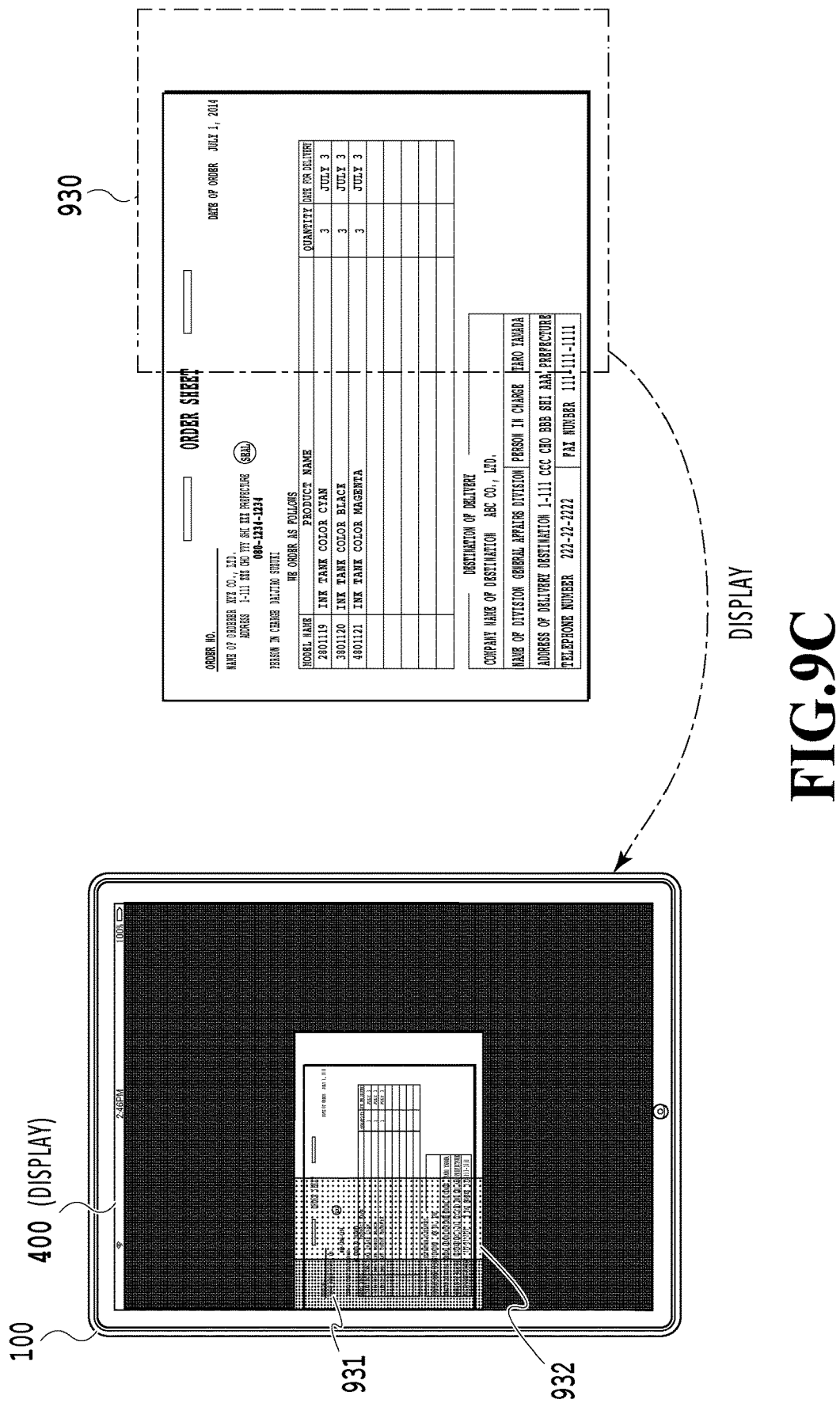
FIG. 9C is a diagram showing a state of a display at the time of third image capturing in the case where image capturing is performed by dividing the image capturing into three times in total.

At step 711, the display control module 312 reduces the image included in the smallest rectangle (that is, the image of the live view image to which the already-captured area is added) by using the reduction ratio α calculated at step 710 and displays the reduced image on the display. FIG. 9A to FIG. 9C each show the state of the display (the display area 400 of the touch panel 101) at each time of the first to third image capturing in the case where image capturing is performed by dividing the image capturing into three times. FIG. 9A shows the state at the time of the first image capturing and a live view image 910 taken in by the image capturing sensor is displayed so as to occupy the entire screen in the display area 400. FIG. 9B shows the state at the time of the second image capturing and a live view image 920 taken in by the image capturing sensor and an image area 921 obtained by the first image capturing are displayed in a state of being reduced so as to be included within the display area 400. In the reduced display, the image area 921 is displayed in a shaded state. FIG. 9C shows the state at the time of the third image capturing and a live view image 930 taken in by the image capturing sensor and image areas 931 and 932 obtained by the first image capturing and the second image capturing, respectively, are displayed in a state of being further reduced so as to be included within the display area 400. In FIG. 9C, the image area 932 obtained by the second image capturing and the image area 931 obtained by the first image capturing are displayed identifiably by displaying the image area 932 in a more coarsely shaded state than the image area 931. Here, the image area obtained by the first image capturing and the image area obtained by the second image capturing can be identified by the density of shading, but this is not limited. What is required is to enable a user to identify that the image areas are obtained by different image capturing and it may also be possible to display the image areas in different colors.

In the examples in FIG. 9B and FIG. 9C described above, the reduced displays are produced so that the center of the display and the center of the live view image coincide with each other at all times. However, the method of producing a reduced display is not limited to this. For example, it may also be possible to produce the display so that the center of the image of the live view image to which the already-captured area is added is located at the center of the display. Further, in the present embodiment, for the portion where the live view image and the already-captured area overlap, the live view image is displayed preferentially at all times (the captured image is overwritten), but it may also be possible to determine a borderline at an arbitrary position of the overlap portion. For example, it may also be possible to determine the center line of the overlap portion to be a borderline or to determine a borderline that does not pass through the portion recognized as an aggregation of sentences.

Figure 10:
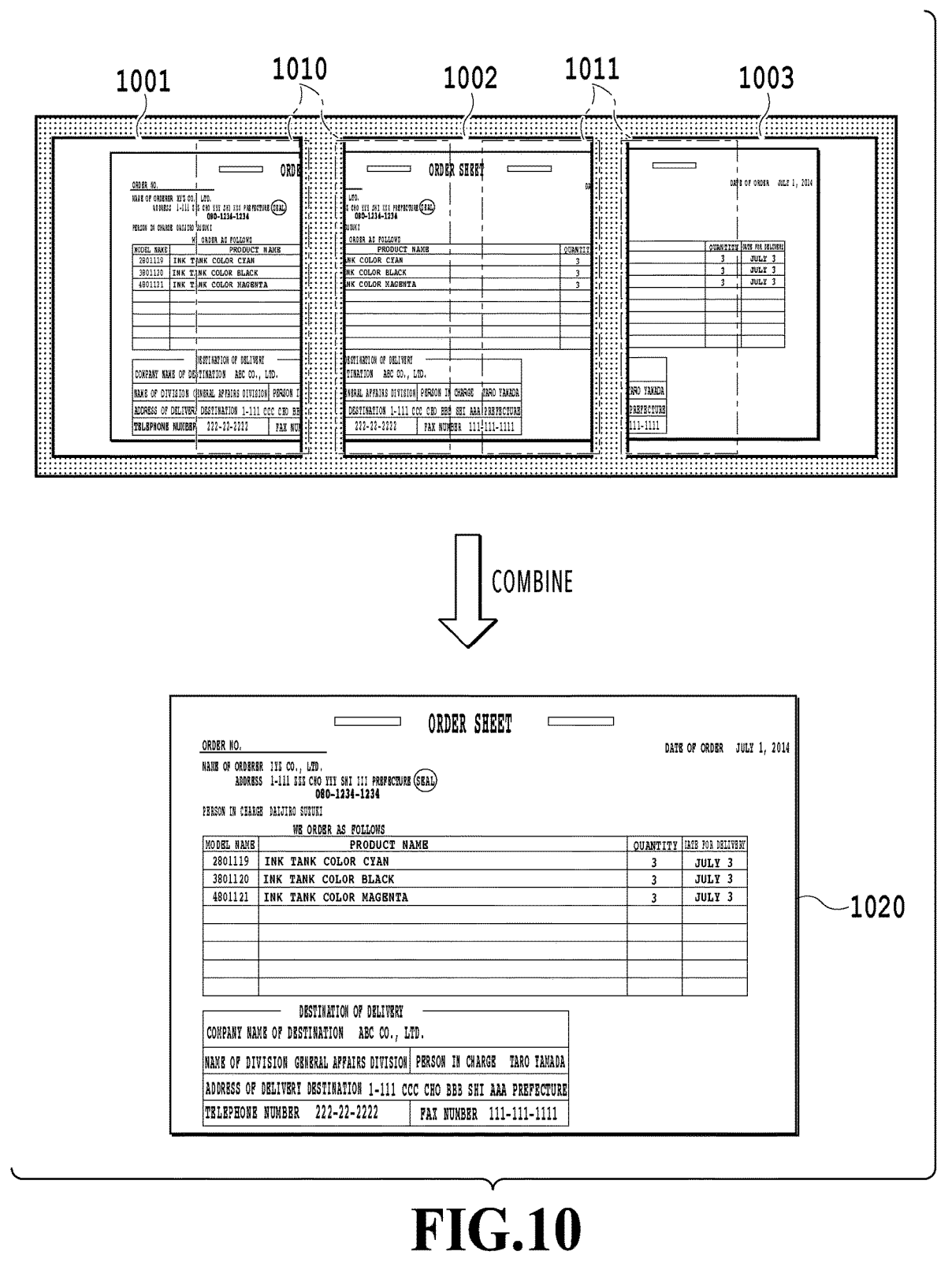

In the case where the scheduled number of times of image capturing has been completed, at step 717, the image combination module 316 generates an entire image corresponding to the entire target document by combining (synthesizing) all the saved captured images. Specifically, the entire image is generated by stitching processing using the feature points obtained at step 703 and the homography matrix obtained at step 715. FIG. 10 shows the way one entire image is finished by combining a total of three captured images. Each of captured images 1001 to 1003 has a portion that overlaps another captured image. For example, between the captured images 1001 and 1002, a one-dot chain line rectangle 1010 is the overlap portion and between the captured images 1002 and 1003, a one-dot chain line rectangle 1011 is the overlap portion. Because of this, the overlap portions are specified based on the feature amount of each captured image and then, an entire 1020 is obtained by combining the captured images into one image as shown at the bottom in FIG. 10. At this time, in order to increase the character recognition accuracy of OCR processing for the finished entire image, it may also be possible to link the captured images at the portion where no character exists or to adjust the magnification of each captured image. Further, it may also be possible to control the guide display so that the overlap portion with another captured image becomes as large as possible and to employ a captured image of a higher image quality for the overlap portion with another captured image of each of the acquired and saved captured images at the time of combination. In the case where the generation of the entire image is completed, this processing is terminated.

The above is the contents of the entire image generation processing.

According to the present embodiment, in the case where the entire object, such as a business form, is captured by the mobile terminal by dividing image capturing into a plurality of times, it is possible to display the already-captured area on the display along with the area being captured so that the guide display function performed by the already-captured area is not lost.

Second Embodiment

In the first embodiment, a reduced display is produced so that the already-captured area that plays a role of a guide does not extend off the display. In such a case, depending on the total number of times of image capturing and the size of a business form, the live view image that is displayed along with the already-captured area becomes too small with respect to the display. Consequently, an aspect is explained as a second embodiment in which a lower limit value of the reduction ratio is set so as to prevent an already-captured area and a live view image from becoming too small. Explanation of the contents in common to those of the first embodiment is omitted or simplified and in the following, different points are explained mainly.

In the present embodiment, a lower limit value $\alpha_{min}$ of the reduction ratio is determined and stored in advance in the RAM and the like. Then, at step (S710) of calculating the reduction ratio in the entire image generation processing described previously, the lower limit value $\alpha_{min}$ is read and the reduction ratio is determined so as not to become smaller than this. Here, the lower limit value $\alpha_{min}$ is set to a value determined by a user based on the physical size of the mobile terminal and the display that are used, for example to a fixed value, such as 0.5 and 0.7. At this time, it is considered to set the lower limit value $\alpha_{min}$ to a small value in the case where the physical size of the display is comparatively large, such as a tablet, and to set the lower limit value $\alpha_{min}$ to a large value in the case where the physical size of the display is comparatively small, such as a smartphone. Then, in the case where the reduction ratio calculated at step 710 is smaller than the lower limit value $\alpha_{min}$, the lower limit value $\alpha_{min}$ is determined to be the reduction ratio that is applied. In accordance with the reduction ratio thus determined, the image included in the smallest rectangle is reduced and displayed on the display.

Further, it may also be possible to derive and apply the lower limit value $\alpha_{min}$ during the entire image generation processing in place of determining and storing the lower limit value $\alpha_{min}$ in advance in the RAM and the like. In this case, for example, a table or the like in which physical sizes (diagonal line lengths) of displays and the lower limit values $\alpha_{min}$ are associated with each other is prepared in advance and the lower limit value $\alpha_{min}$ optimum for the display that is used is determined by referring to the table at the time of start of the entire image generation processing. At this time, it may also be possible to read information on the physical size of the display itself, or to calculate the physical size by reading information on the number of constituent pixels and the resolution of the display. In the case of the latter, for example, on a condition that the number of constituent pixels of the display is 600×800 and the resolution is 200 dpi, the physical size is 5 inches and the lower limit value $\alpha_{min}$ in accordance with 5 inches is derived based on the table and applied.

It may also be possible to use the present embodiment in combination with various variations explained in the first embodiment. For example, in the case where the calculated reduction ratio is not smaller than the lower limit value, the center of the live view image and the center of the display are caused to coincide with each other, in the case where the calculated reduction ratio is smaller than the lower limit value, the center of the image of the live view image to which the already-captured area is added and the center of the display are caused to coincide with each other, and so on. As above, according to the present embodiment, by providing the lower limit to the reduction ratio, it is possible to prevent the already-captured area and the live view image from becoming too small.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where an entire object is captured by a mobile terminal by dividing image capturing into a plurality of times, it is possible to display an already-captured area on a display along with an area being captured so that the guide display function performed by the already-captured area is not lost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-015437, filed Jan. 31, 2017 which is hereby incorporated by reference wherein in its entirety.

What is claimed is:

1. An information processing apparatus, comprising:
a camera that takes images;
a display;
at least one processor; and
at least one memory that stores instructions,
wherein, when executed by the at least one processor, the instructions cause the information processing apparatus to:
control the display to display a live view image in a case where a captured image has not been stored in the memory yet, wherein the live view image is an image currently being taken, but not yet captured, via the camera;

store, as the captured image, an image currently being taken via the camera in a case where a condition for storing the captured image is satisfied when the live view image is displayed;

control the display to display, in a case where at least one captured image is already stored in the memory, both of the live view image and an image of an already-captured area by using a matrix of a holography to perform projective transformation of the stored at least one captured image onto a plane space of the live view image and by further performing a reduction process for both of the live view image and the projective-transformation-performed image of the already-captured area so that both of the live view image and the projective-transformation-performed image of the already-captured area are displayed in the display, wherein the projective transformation and the reduction process are performed each time the live view image is taken in the case where the at least one captured image is already stored in the memory;

further store, as one of the captured images, an image currently being taken via the camera in a case where a condition for storing the captured image is satisfied when both of the live view image and the image of the already-captured area are displayed; and combine the stored captured images.

2. The information processing apparatus according to claim 1, wherein the reduction process comprises:

calculating a reduction ratio with which both of the live view image and the projective-transformation-performed image of the already-captured area are displayed in the display; and reducing both of the live view image and the projective-transformation-performed image of the already-captured area based on the calculated reduction ratio.

3. The information processing apparatus according to claim 2, wherein the image of the already-captured area is an image of an already-captured area of an object included in the captured image, and wherein the reduction ratio is calculated based on a rectangle that includes the live view image and the projective-transformation-performed image of the already-captured area for which the projective transformation onto the plane space has been performed.

4. The information processing apparatus according to claim 3, wherein the reduction ratio is calculated based on coordinates representing vertexes of the rectangle and a number of constituent pixels of a display area in the display.

5. The information processing apparatus according to claim 2, wherein in a case where the calculated reduction ratio is lower than a predetermined lower limit value, both of the live view image and the projective-transformation-performed image of the already-captured area are reduced in accordance with the lower limit value.

6. The information processing apparatus according to claim 5, wherein the lower limit value is determined in accordance with a physical size of the display.

7. The information processing apparatus according to claim 1, wherein in a case where the already-captured area consists of a plurality of captured images obtained by different image capturing, both of the live view image and the projective-transformation-performed image of the already-captured area are displayed so that an each area corresponding to each image capturing can be identified.

8. The information processing apparatus according to claim 1, wherein both of the live view image and the projective-transformation-performed image of the already-captured area are displayed so that a center of the live view image and a center of a display area in the display coincide with each other.

9. The information processing apparatus according to claim 1, wherein both of the live view image and the projective-transformation-performed image of the already-captured area are displayed so that a center of an image of the live view image to which the already-captured area is added and the center of a display area in the display coincide with each other.

10. The information processing apparatus according to claim 1, wherein, in a case where the condition is not satisfied when both of the live view image and the image of the already-captured area are displayed, both of a live view image newly taken via the camera and the image of the already-captured area are displayed by performing the projective transformation and the reduction process again.

11. A display control method comprising:

displaying a live view image on a display in a case where a captured image has not been stored in a memory yet, wherein the live view image is an image currently being taken, but not yet captured, via a camera;

storing, as the captured image, an image currently being taken via the camera in a case where a condition for storing the captured image is satisfied when the live view image is displayed;

displaying, in a case where at least one captured image is already stored in the memory, both of the live view image and an image of an already-captured area by using a matrix of a homography to perform projective transformation of the stored at least one captured image onto a plane space of the live view image and by further performing a reduction process for both of the live view image and the projective-transformation-performed image of the already-captured area so that both of the live view image and the projective-transformation-performed image of the already-captured area are displayed in the display, wherein the projective transformation and the reduction process are performed each time the live view image is taken in the case where the at least one captured image is already stored in the memory;

further storing, as one of the captured images, an image currently being taken via the camera in a case where a condition for storing the captured image is satisfied when both of the live view image and the image of the already-captured area are displayed; and combining the stored captured images.

12. A non-transitory computer readable storage medium storing a program for causing a computer to perform:

displaying a live view image on a display in a case where a captured image has not been stored in a memory yet, wherein the live view image is an image currently being taken, but not yet captured, via a camera;

storing, as the captured image, an image currently being taken via the camera in a case where a condition for storing the captured image is satisfied when the live view image is displayed;

displaying, in a case where at least one captured image is already stored in the memory, both of the live view image and an image of an already-captured area by using a matrix of a homography to perform projective transformation of the stored at least one captured image onto a plane space of the live view image and by further performing a reduction process for both of the live view image and the projective-transformation-performed image of the already-captured area so that both of the live view image and the projective-transformation-performed image of the already-captured area are displayed in the display, wherein the projective transformation and the reduction process are performed each time the live view image is taken in the case where the at least one captured image is already stored in the memory;

further storing, as one of the captured images, an image currently being taken via the camera in a case where a condition for storing the captured image is satisfied when both of the live view image and the image of the already-captured area are displayed; and combining the stored captured images.

\* \* \* \* \*